C. POTTS.
LIQUID DISTRIBUTING APPARATUS.
APPLICATION FILED NOV. 23, 1908.
935,231.
Patented Sept. 28, 1909.
2 SHEETS—SHEET 2.
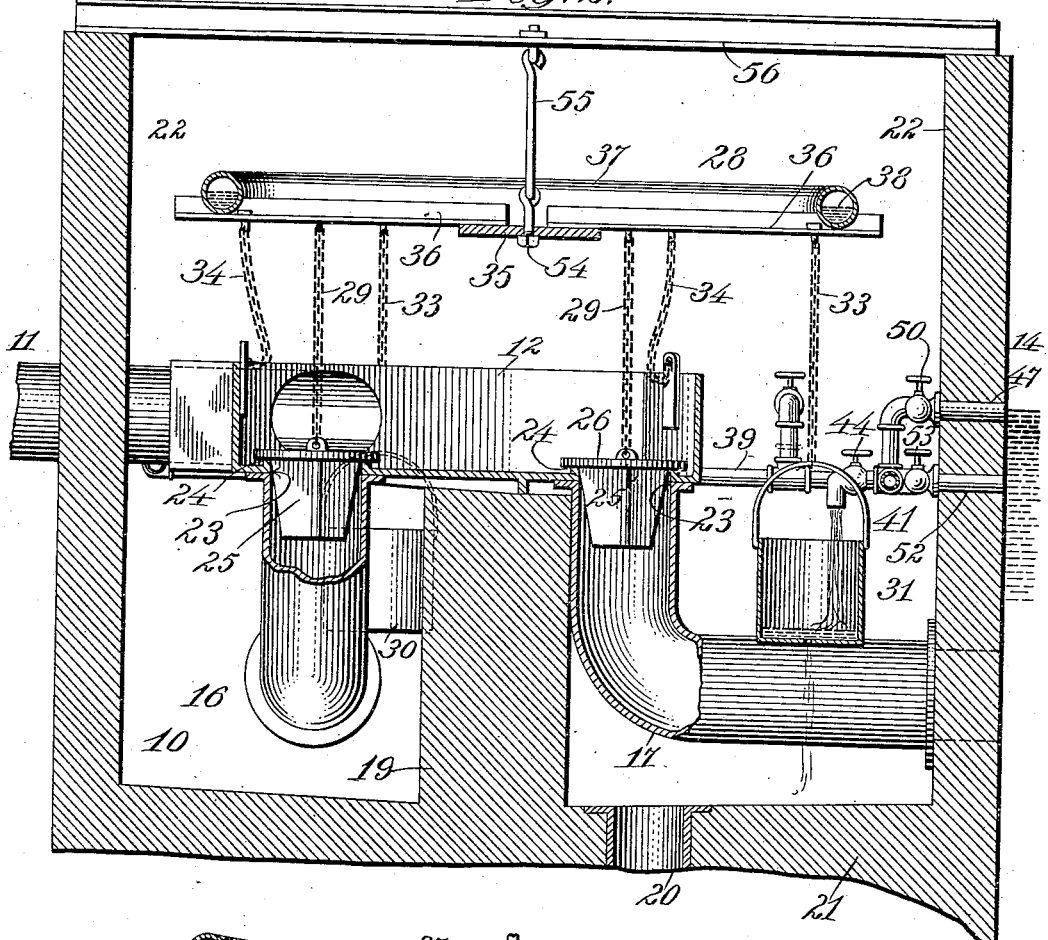
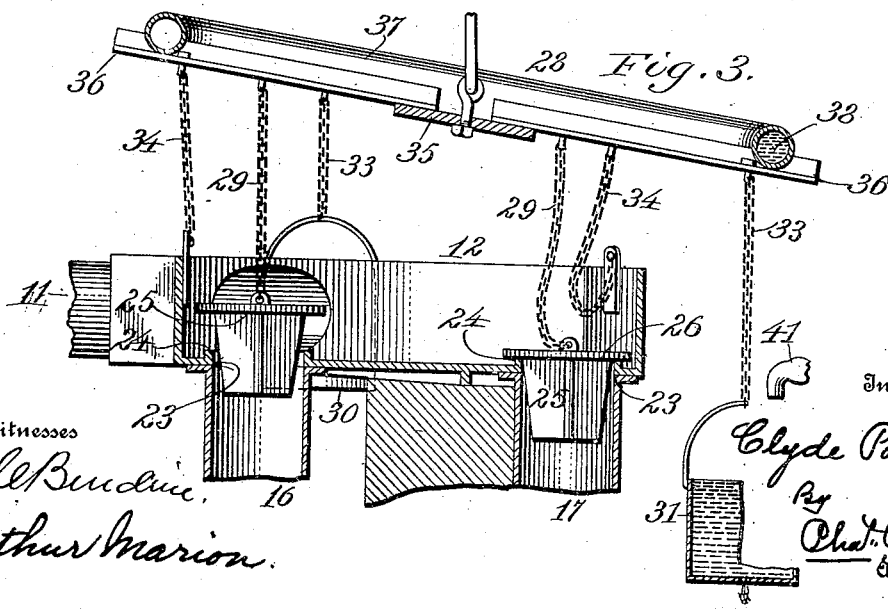
Witnesses
Olle Bindine
Arthur Marion
Inventor
Clyde Potts,
By
Chas. C. Gill
Attorney

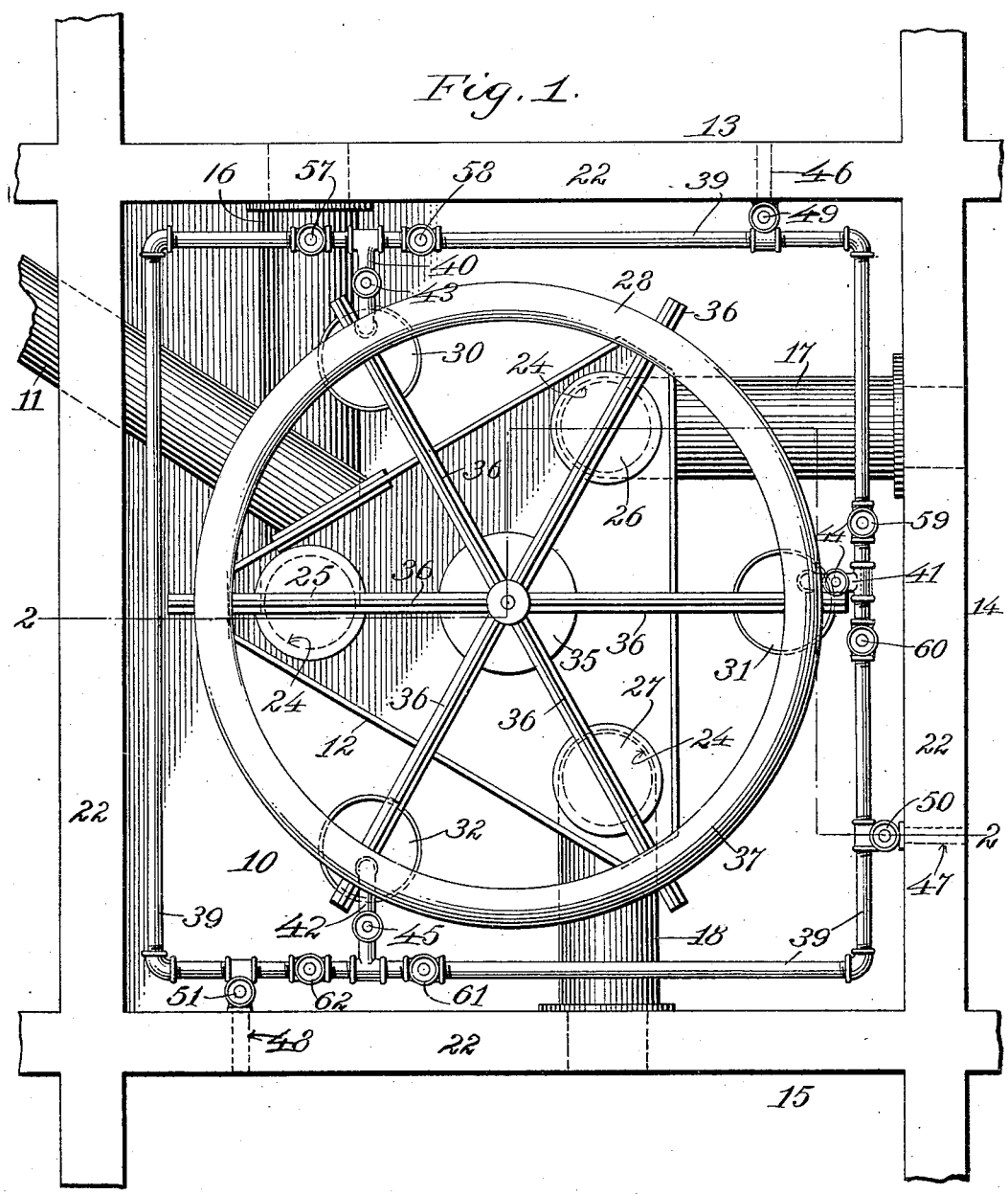

UNITED STATES PATENT OFFICE.

CLYDE POTTS, OF MORRISTOWN, NEW JERSEY.

LIQUID-DISTRIBUTING APPARATUS.

935,231.  Specification of Letters Patent.  Patented Sept. 28, 1909.

Application filed November 23, 1908. Serial No. 463,974.

*To all whom it may concern:*

Be it known that I, CLYDE POTTS, a citizen of the United States, and a resident of Morristown, in the county of Morris and State of New Jersey, have invented certain new and useful Improvements in Liquid-Distributing Apparatus, of which the following is a specification.

The invention relates to improvements in apparatus for the distribution of liquids, and it consists in the novel features and combinations of parts hereinafter described, and particularly pointed out in the claims.

In the example of my invention herein presented, I illustrate the same as embraced in a system for use in the purification of sewage, such system comprising a main or septic tank in which the sewage undergoes certain treatment, a series of contact beds to successively receive the liquid sewage from said tank and which are successively emptied and means for automatically distributing the liquid sewage from said tank to said beds. This general system is well understood.

My invention pertains to novel and efficient means for automatically directing the flow of liquid sewage from the main tank to the several contact beds in succession, and the invention will be fully understood from the detailed description hereinafter presented, reference being had to the accompanying drawings, in which:

Figure 1 is a top view of a portion of a sewage-purification system employing my invention; Fig. 2 is a vertical section of the same on the dotted line 2—2 of Fig. 1, this figure showing the distributing mechanism of my invention in the initial position it will have when first installed or not in operation but preparatory to being placed in operation, and Fig. 3 is a corresponding section of a portion of the same in an operated position.

In the drawings, 10 denotes a central chamber or reservoir containing the distributing mechanism of my invention, 11 a pipe for liquid sewage leading from a main or septic tank, not shown, to a tank, 12 forming a part of said mechanism, and 13, 14, 15, respectively, indicate contact beds which in succession receive the liquid sewage from said tank 12 through pipes 16, 17, 18 leading therefrom to the respective beds.

The tank 12 may be of cast iron and mounted on a supporting column 19 at the center of the chamber 10, which has a drain outlet 20 in its bottom 21 and is formed of walls 22 and said bottom. I find it convenient to construct the tank 12 with sides defining an equilateral triangle but of course the tank may have any suitable outline. The tank 12, which is stationary, is formed in its bottom with outlet openings 23 surrounded by valve seats 24 and leading respectively into the distributing pipes 16, 17, 18. The openings 23 are controlled by valves 25, 26, 27, respectively, which are movable vertically and adapted to the seats 24. The liquid sewage flows from the pipe 11 into the tank 12 and thence through the respective openings 23, as successively uncovered, to the pipes 16, 17, 18.

The means for elevating and lowering or opening and closing the valves 25, 26, 27 in succession comprise novel features of my invention and embrace a centrally suspended superposed tiltable frame 28, chains 29 leading therefrom to the respective valves 25, 26, 27 and which chains are taut when said frame is horizontal, as shown in Fig. 2, and pails 30, 31, 32 suspended by chains 33 from said frame in such arrangement that there shall be a pail at one side of said frame opposite to each valve chain at the other side thereof. The frame 28 is also equipped with check-chains 34 whose lower ends are fastened to the tank 12 and which chains prevent any undue tilting of said frame. The chains 34 are at the angular corners of the tank 12 and opposite to each valve therein, and said chains are slack when the frame 28 is horizontal, as shown in Fig. 2, and one of said chains becomes taut when the frame 28 is tilted, as shown in Fig. 3.

The frame 28 preferably comprises a central plate 35, arms 36 of structural shape extending radially therefrom and a hollow circular ring 37, preferably formed of piping, mounted on the outer portions of said arms concentrically with said plate 35 and containing a movable substance such as oil, glycerin, mercury or the like 38 or a substitute therefor, as metal balls, which shall not solidly fill said ring but be capable of moving to the lower side of said ring when the frame 28 is tilted, as shown in Fig. 3, so as to aid in lifting the valve connected with the opposite side of the frame, said valve in Fig. 3 being the one numbered 25 and said substance being employed as a counterbalance therefor and to hold the valve open until the frame 28 is tilted in another direction in the regular operation of the system. The frame 28 is suspended from the center of the plate 35 by an eye-bolt 54 and link 55 from a beam 56 supported on the side walls of the chamber 10.

The liquid sewage flows into the tank 12 and thence into the contact beds 13, 14, 15 in succession as the valves 25, 26, 27 are in succession opened by the tilting of the frame 28 to elevate them from their seats, and said frame 28 is tilted to elevate the said valves in succession by the surplus or overflow of the liquid sewage from the successive beds into the pails 30, 31, 32, which in succession becoming filled will pull one side of the frame 28 downwardly and cause the other side thereof to move upwardly and open the valve connected with it. Each pail 30, 31, 32 has a restricted opening in its bottom to permit the liquid sewage to escape from it, as indicated in Figs. 2 and 3, so that no one pail may hold the frame 28 in a tilted position for an undue period.

The means for enabling the respective beds 13, 14, 15 to overflow into the pails 30, 31, 32 in succession comprise a line of piping 39 extending around the inner walls of the chamber 10, pipes 40, 41, 42, respectively, leading therefrom to said pails and having valves 43, 44, 45, respectively, and pipes 46, 47, 48, respectively, leading from said beds to said piping 39 and having valves 49, 50, 51, respectively. If desired additional pipes 52 having valves 53 (Fig. 2) may lead from the beds 13, 14, 15 to the piping 39 so that the period at which the overflow from said beds to the pails 30, 31, 32 may take place may be regulated at will. The pipes 52 are below the pipes 46, 47, 48 and when their valves 53 are open the overflow from the beds will take place through them at an earlier period than it could take place through the pipes 46, 47, 48. When the valves 53 are closed the overflow to the pails must take place through the pipes 46, 47, 48, and then a higher level of the liquid sewage in the beds must be attained before the overflow into the respective pails takes place. In Fig. 2, which indicates an initial condition of the apparatus, the valve 53 in pipe 52 is closed and the valve 50 open and the overflow from the bed 14 to the pail 31 is through the pipe 47.

The piping 39 is provided at opposite sides of the pipe 40 with valves 57, 58, at opposite sides of the pipe 41 with valves 59, 60, and at opposite sides of the pipe 42 with valves 61, 62, said valves being furnished for enabling any of the contact beds to be cut out of the system when required and to compel the overflow from the respective beds to pass to the pails intended to receive the same.

The operation of the apparatus hereinbefore described may be varied in respect to the order in which the beds 13, 14 and 15 may be supplied with the liquid sewage, but an understanding of the operation may be had if we assume that all of the valves 53 and valves 57, 59, 61 are closed and valves 58, 60 and 62, and valves 49, 50 and 51 and valves 43, 44, 45 are open, and that the liquid in the bed 14 is overflowing into the pail 31, as shown in Fig. 2. After the pail 31 receives a sufficient weight of the overflow through the pipes 47 and 41, it will tilt the frame 28 downwardly (Fig. 3) and elevate the valve 25 connected with the opposite side of said frame, the movable weight 38 within the ring 37 traveling toward the lower side of the tilting frame 28 and coöperating with the weight of the pail 31 and its contents in elevating said valve 25. When the valve 25 is elevated the flow from the pipe 11 into the tank 12 will pass out through the pipe 16 and fill the bed 13, and this will continue until the bed 13 has become filled and its overflow passes through the pipe 46 into the pipe 39 and thence through the pipe 40 into the pail 30, to a sufficient extent to enable the weight of the pail to pull the frame 28 downwardly toward it, this having the effect of elevating the opposite side of the frame 28 and lifting the valve 27 and seating the valve 25; whereupon the sewage entering the tank 12 will flow through the pipe 18 into the bed 15 until the latter has become filled and its overflow passes through the pipe 48, pipe 39 and pipe 42 into the pail 32 to a sufficient extent to cause said pail to pull its side of the frame 28 downwardly and turn the opposite side of said frame upwardly, which action has the effect of lowering the valve 27 to its seat and lifting the valve 24; whereupon the liquid sewage will pass through the pipe 17 to the bed 14 until the overflow from said bed passes through the pipes 47, 39, 41 to the pail 31, with the result hereinbefore described.

The operation just described of successively filling the contact beds will continue automatically just as long as the same may be desired, said beds being filled in succession and emptying in succession, as usual. One tilted position of the frame 28 is shown in Fig. 3, this position having been caused by the weight of liquid in the pail 31 and the movement of the counterbalance 38 to the lower side of the tilted frame. During the active operation of the apparatus the frame 28 is always in a tilted position or in movement changing from one tilted position to another tilted position.

The pails 30, 31, 32 have a restricted outlet in their bottoms so that the liquid contained in them, when they descend to tilt the frame 28, may leak out into the chamber 10, the leakage from a pail which has tilted the frame 28 enabling another pail receiving the overflow to tilt the frame 28 in its direction at the proper time. The frame 28 in each tilting action opens one valve and closes another and the overflow which actuates the frame 28 is always from the bed filled through the open valve. The movable weight 38 in the frame 28 slightly more than counterbalances the weight of the valve to be lifted, and therefore when the weight of a pail starts to tilt the frame 28 in any one direction the weight 38 will move in that direction and coöperate with the pail in completing the tilting of said frame and elevating the valve to be lifted. I preferably form the weight 38 of a liquid which will readily flow, but a reasonably satisfactory result on the same principle of operation may be had if metal balls are employed in the pipe 37 in lieu of a liquid.

If during the operation of the apparatus it should be desired to cut out bed 14, for illustration, the valves 50, 53 in pipes 47, 52 (Fig. 2) will be closed, the valve 44 in pipe 41 opened, the valves 62, 61 in pipe 39 opened, the valve 45 in pipe 42 closed, valves 57, 59 in pipe 39 closed and valve 58 in said pipe opened, and thereupon the overflow from bed 15 would be through pipe 48 into pipe 39, thence through valves 62, 61, 60 into pipe 41 and thence into the pail 31, which pail upon becoming filled will tilt its side of the frame 28 downwardly and open the valve 25 so that the liquid sewage may flow from the tank 12 into the pipe 16 and thence enter the bed 13; and the overflow from the bed 13 would pass through the pipe 46 into the pipe 39 and thence through valve 58 and pipe 40 into the pail 30, which upon becoming filled will tilt its side of the frame 28 downwardly and open the valve 27, thereby allowing the sewage from the tank 12 to flow through the pipe 18 into the bed 15. In the condition of the apparatus just hereinbefore described only valves 25, 27 will be kept in operation, since only two of the beds will be in use.

If it should be desired to employ beds 14, 15 and cut out bed 13 the various valves will be so set that the overflow from bed 14 will pass through the pipe 39 to the pipe 40 and thence enter the pail 30 for opening the valve 27 for the pipe 18 leading to bed 15, and that the overflow from the bed 15 will pass through the pipe 42 to the pail 32 for opening the valve 26 and closing the valve 27, the supply from the tank 12 then passing through the pipe 17 to the bed 14. If it should be desired to cut out the bed 15 and only employ the beds 13 and 14, the valves in the piping will be arranged to permit the overflow from the bed 14 to enter the pail 31 for opening the valve 25 and for enabling the overflow from the bed 13 to pass around to the left, looking at Fig. 1, through the pipe 39 to the pipe 42 and thence to the pail 32, for opening the valve 26. The particular order in which the contact beds may be supplied may be regulated at will by means of the valves provided in the piping and any one of said beds may be cut out from the system whenever desired.

In connection with the operation of the apparatus I call attention to the fact that after the frame 28 has been tilted by the filling of a pail with overflow from one bed, the movable weight 38 will retain said frame in such position while the liquid in said pail is draining therefrom and until sufficient overflow from another bed has passed into its pail to overcome said weight and tilt said frame downwardly in the direction of said pail.

The beds 13, 14, 15 constitute receivers to which the liquid from the pipe 11 is distributed, and the pipes 16, 17, 18 constitute conduits for directing or delivering the liquid to said beds. I do not limit the invention specifically to "contact beds" as the receivers for the liquid, since other forms of receivers or filter beds may be employed.

What I claim as my invention and desire to secure by Letters Patent, is:

1. In a liquid distributing system, a tank having outlet pipes leading to the receivers for the liquid and valves for said pipes, means for delivering the liquid to said tank, and means actuated by the overflow from said receivers to automatically successively open said valves and comprising a tiltable frame connected with said valves and having pails connected with it to receive said overflow, said pails having restricted openings to permit the leakage through them of the overflow; substantially as set forth.

2. In a liquid distributing system, a tank having outlet pipes leading to the receivers for the liquid and valves for said pipes, means for delivering the liquid to said tank, and means actuated by the overflow from said receivers to automatically successively open said valves and comprising a tiltable frame connected with said valves and having pails connected with it to receive said overflow, said frame possessing an encompassing portion having a movable weight to move to the side thereof tilted downwardly, and said pails having restricted openings to permit the leakage through them of the overflow; substantially as set forth.

3. In a liquid distributing system, a tank having outlet pipes leading to the receivers for the liquid and valves for said pipes, means for delivering the liquid to said tank, and means actuated by the overflow from said receivers to automatically successively open said valves and comprising a tiltable frame connected with said valves and having pails connected with it to receive said overflow, said frame possessing a hollow encompassing portion partly filled with a liquid to flow to the side thereof tilted downwardly, and said pails having restricted openings to permit the leakage through them of the overflow; substantially as set forth.

4. In a liquid distributing system, a tank having outlet pipes leading to the receivers for the liquid and valves for said pipes, means for delivering the liquid to said tank, and means actuated by the overflow from said receivers to automatically successively open said valves and comprising a tiltable frame connected with said valves and having pails connected with it to receive said overflow, said pails having restricted openings to permit the leakage through them of the overflow, combined with means for varying the period at which the overflow to said pails shall take place; substantially as set forth.

5. In a liquid distributing system, a tank having outlet pipes leading to the receivers for the liquid and valves for said pipes, means for delivering the liquid to said tank, and means actuated by the overflow from said receivers to automatically successively open said valves and comprising a tiltable frame connected with said valves and having pails connected with it to receive said overflow, said pails having restricted openings to permit the leakage through them of the overflow, combined with a series of independent valved pipes arranged at different heights for conducting the overflow from said receivers to said pails and varying the period at which the overflow may take place; substantially as set forth.

6. In a liquid distributing system, a tank having outlet pipes leading to the receivers for the liquid and valves for said pipes, means for delivering the liquid to said tank, and means actuated by the overflow from said receivers to automatically successively open said valves and comprising a tiltable frame connected with said valves and having pails connected with it to receive said overflow, said pails having restricted openings to permit the leakage through them of the overflow, combined with a line of piping having branches connected with said receivers to take said overflow and branches leading to said pails for delivering the same thereto, said branches having valves in them and the pipe line having valves at opposite sides of its said delivery branches; substantially as set forth.

Signed at New York city, in the county of New York and State of New York, this 19th day of November A. D. 1908.

CLYDE POTTS.

Witnesses:
ARTHUR MARION,
CHAS. C. GILL.